(12) United States Patent
Rule et al.

(10) Patent No.: US 9,178,792 B2
(45) Date of Patent: Nov. 3, 2015

(54) PROTOCOL SENSITIVE VISUAL NAVIGATION APPARATUS

(75) Inventors: Keith D. Rule, Beaverton, OR (US); Michael J. Wadzita, Vancouver, WA (US); Walter R. Strand, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 997 days.

(21) Appl. No.: 13/297,877

(22) Filed: Nov. 16, 2011

(65) Prior Publication Data

US 2013/0125006 A1 May 16, 2013

(51) Int. Cl.
G06F 13/42 (2006.01)
H04L 12/26 (2006.01)
H04L 12/24 (2006.01)

(52) U.S. Cl.
CPC ............... H04L 43/18 (2013.01); H04L 41/22 (2013.01)

(58) Field of Classification Search
CPC ....................................................... G06F 13/42
USPC ................ 715/738, 736; 702/57, 67; 709/224
See application file for complete search history.

(56) References Cited

U.S. PATENT DOCUMENTS

| | | | | |
|---|---|---|---|---|
| 5,282,028 A * | 1/1994 | Johnson et al. | ................ | 725/139 |
| 5,764,155 A * | 6/1998 | Kertesz et al. | ................ | 700/295 |
| 5,833,623 A * | 11/1998 | Mann et al. | .................... | 600/523 |
| 5,850,388 A * | 12/1998 | Anderson et al. | ............. | 370/252 |
| 6,597,727 B2 * | 7/2003 | Philips et al. | ................. | 375/147 |
| 6,604,139 B1 * | 8/2003 | Sajina et al. | .................. | 709/224 |
| 6,639,607 B1 * | 10/2003 | Ferguson et al. | ............. | 715/734 |
| 6,996,623 B1 * | 2/2006 | Kawano et al. | ................ | 709/231 |
| 7,054,296 B1 * | 5/2006 | Sorrells et al. | ................ | 370/338 |
| 7,607,093 B2 * | 10/2009 | Blomquist | .................... | 715/736 |
| 8,005,133 B2 * | 8/2011 | Smith | ........................... | 375/228 |
| 8,018,857 B2 * | 9/2011 | Gonda | ....................... | 370/241.1 |
| 8,046,720 B2 * | 10/2011 | Wirth | ........................... | 715/853 |
| 2001/0015984 A1 * | 8/2001 | Lenz et al. | .................... | 370/469 |
| 2002/0152041 A1 * | 10/2002 | Loughry | ......................... | 702/57 |
| 2003/0140137 A1 * | 7/2003 | Joiner et al. | .................. | 709/224 |
| 2003/0220753 A1 * | 11/2003 | Pickerd et al. | .................. | 702/67 |

(Continued)

FOREIGN PATENT DOCUMENTS

WO 2005081728 A2 9/2005

OTHER PUBLICATIONS

Lamping, U. "Wireshark User's Guide for Wireshark 1.7", Jul. 5, 2011, pp. i-223, XP002694937, URL: http://web.archive.org/web/20110705021327/http://www.wireshark.org/download/docs/user-guide-a4.pdf, retrieved on Apr. 8, 2013.

(Continued)

*Primary Examiner* — Daeho Song
(74) *Attorney, Agent, or Firm* — Marger Johnson

(57) ABSTRACT

Embodiments of this invention include a protocol sensitive visual navigation apparatus, and associated methods, for navigating and relating different protocol levels of a protocol. A test and measurement instrument can include the protocol sensitive visual navigation apparatus, which can facilitate analyzing, searching, and measuring various aspects of the different protocol layers and cross-correlating items from one protocol layer to another protocol layer. The type and characteristics of the analysis is informed by a selected protocol layer. Physical layer signals or events can be correlated to protocol level information, thereby increasing an understanding of the overall protocol and associated protocol layers and events.

20 Claims, 5 Drawing Sheets

(56) References Cited

U.S. PATENT DOCUMENTS

| | | | |
|---|---|---|---|
| 2005/0175079 A1* | 8/2005 | Gamper et al. | 375/228 |
| 2005/0201488 A1 | 9/2005 | Duff et al. | |
| 2006/0034248 A1* | 2/2006 | Mishra et al. | 370/349 |
| 2006/0245353 A1* | 11/2006 | Voss | 370/230 |
| 2006/0245484 A1* | 11/2006 | Calvin et al. | 375/227 |
| 2007/0030812 A1* | 2/2007 | Mac Donald et al. | 370/241 |
| 2007/0106810 A1* | 5/2007 | Ryman | 709/230 |
| 2007/0260933 A1* | 11/2007 | Siu | 714/39 |
| 2008/0144618 A1* | 6/2008 | Frishberg | 370/389 |
| 2008/0144654 A1* | 6/2008 | Frishberg et al. | 370/466 |
| 2008/0255784 A1* | 10/2008 | Gamper et al. | 702/67 |
| 2008/0310452 A1* | 12/2008 | Vedantham et al. | 370/474 |
| 2009/0037847 A1* | 2/2009 | Achtermann et al. | 715/833 |
| 2009/0110108 A1* | 4/2009 | Kennedy et al. | 375/295 |
| 2010/0063760 A1* | 3/2010 | Rule et al. | 702/68 |
| 2010/0111155 A1 | 5/2010 | Duff et al. | |
| 2011/0230764 A1* | 9/2011 | Baba et al. | 600/454 |
| 2013/0005271 A1* | 1/2013 | Negami et al. | 455/67.7 |
| 2013/0179855 A1* | 7/2013 | Elliott | 716/139 |
| 2014/0051467 A1* | 2/2014 | Tan et al. | 455/501 |
| 2014/0136905 A1* | 5/2014 | Baeckler | 714/57 |

OTHER PUBLICATIONS

European Search Report for Application No. 12192955.8, filed Apr. 9, 7 pages, (Apr. 9, 2013).

* cited by examiner

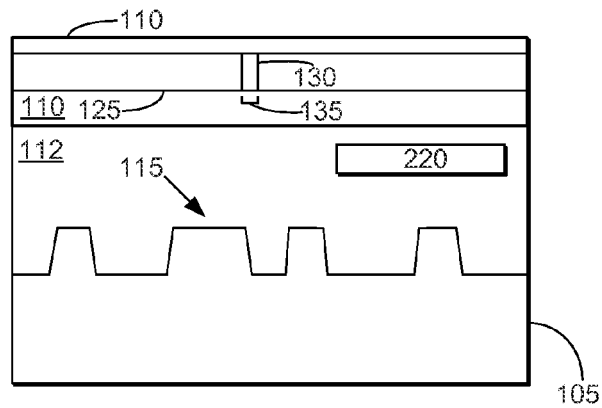
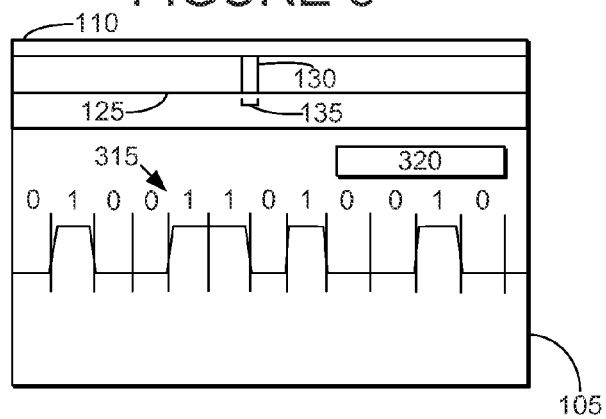
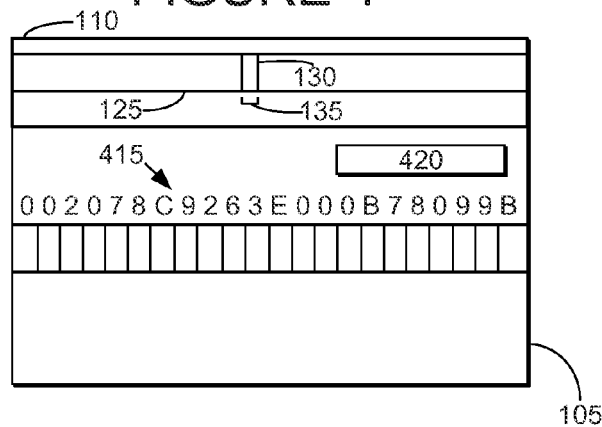

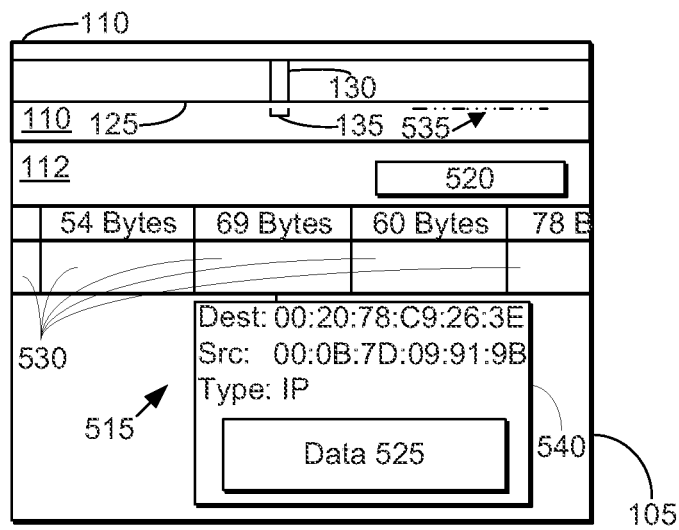
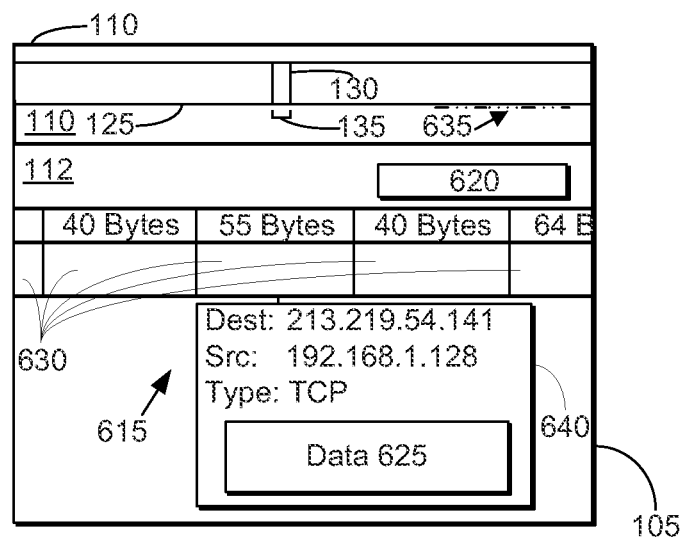

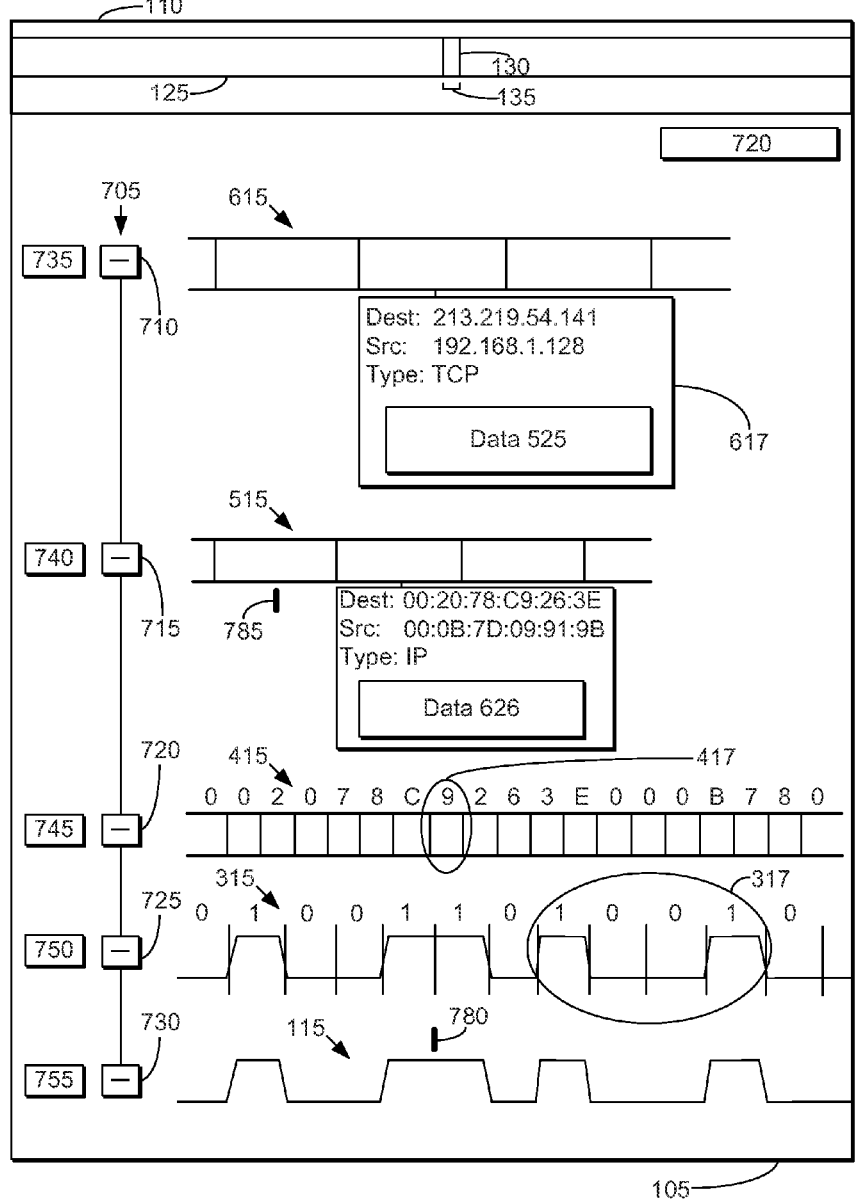

PROTOCOL SENSITIVE VISUAL NAVIGATION APPARATUS

BACKGROUND

Data protocols are typically comprised of different protocol layers. Each layer represents a different level of abstraction of the information associated with the protocol. The protocols in existence today are vast and ever-expanding in terms of quantity and performance. Serial data protocols include, for example, SATA, Fibre Channel, serial attached SCSI (SAS), USB, FireWire, and the like. By way of other examples, protocols can include multiple input decoders such as SPI or $I^2C$, or multi-lane hierarchical decoders such as PCIe and DisplayPort. Protocols need not be digital. For instance, analog TV signals and other non-digital hierarchical signals can also be classified as protocols.

Conventional protocol analyzers are specialized tools that are used to capture and analyze protocol information. The protocol analyzers can analyze, for example, a telecom signal, a bus signal, a network signal, or the like. However, current protocol analyzers have significant limitations. For instance, it is not possible to correlate protocol level information with physical layer signals or events. As buses, especially serial buses, become more predominate, users naturally want to see how protocol information is related to analog events.

Generally, a separate instrument such as an oscilloscope is needed to capture and analyze physical or analog layer signals and events. One of the strengths of an oscilloscope is the ability to record analog characteristics of the physical layer of a protocol. But oscilloscopes do not allow for navigation, visualization, or analysis of higher-level data protocols, nor the ability to link or otherwise correlate protocol level information to physical layer events. Thus, it is difficult or impossible to associate analog characteristics of the physical layer signal underpinning the protocol to higher-level information such as the different abstracted layers of the protocol. Moreover, there is no intuitive way to navigate the different protocol layers, nor associate items between the different layers.

Accordingly, a need remains for a protocol sensitive visual navigation apparatus, which provides the ability to correlate physical layer signals or events to protocol level information, thereby increasing an understanding of the overall protocol and associated layers and events. It would also be desirable for a test and measurement instrument such as an oscilloscope to include the protocol sensitive visual navigation apparatus so that a protocol can be comprehensively analyzed and protocol level events can be related to physical layer events.

BRIEF DESCRIPTION OF THE DRAWINGS

FIG. 2 illustrates a diagram of a display of a test and measurement instrument showing first protocol information according to another example embodiment of the invention.

FIG. 3 illustrates a diagram of a display of a test and measurement instrument showing second protocol information according to yet another example embodiment of the invention.

FIG. 4 illustrates a diagram of a display of a test and measurement instrument showing third protocol information according to still another example embodiment of the invention.

FIG. 5 illustrates a diagram of a display of a test and measurement instrument showing fourth protocol information according to another example embodiment of the invention.

FIG. 6 illustrates a diagram of a display of a test and measurement instrument showing fifth protocol information according to yet another example embodiment of the invention.

FIG. 7 illustrates a diagram of a display of a test and measurement instrument simultaneously showing first, second, third, fourth, and fifth protocol information according to another example embodiment of the invention.

DETAILED DESCRIPTION

Embodiments of this invention include a protocol sensitive visual navigation apparatus, and associated methods, which can be incorporated in a test and measurement instrument such as an oscilloscope. After acquiring a physical signal, a corresponding protocol can be analyzed in such a manner that protocol level events can be correlated to or otherwise associated with physical layer events. Although the visual navigation apparatus disclosed herein can be incorporated in any kind of test and measurement instrument, for the sake of brevity and consistency, but not limitation, the test and measurement instrument will generally be referred to herein as an oscilloscope.

Figure 1A:
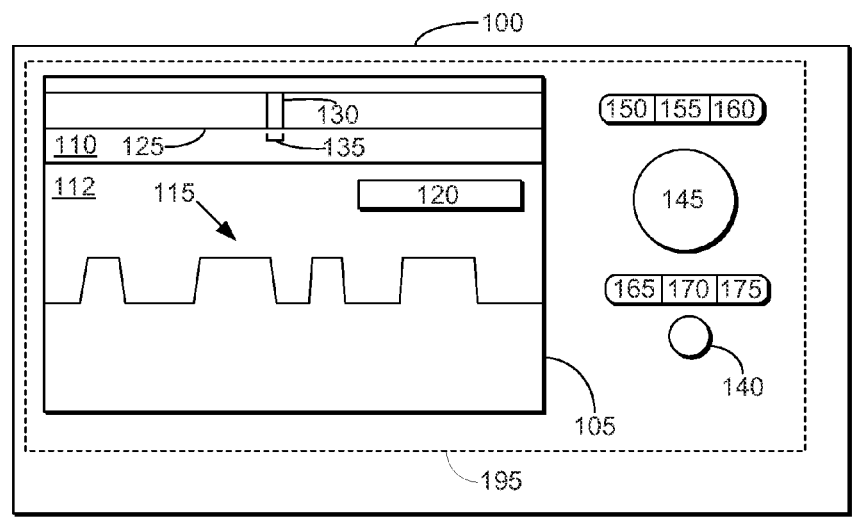
FIG. 1A illustrates a diagram of a display of a test and measurement instrument according to an example embodiment of the present invention.
Figure 1B:
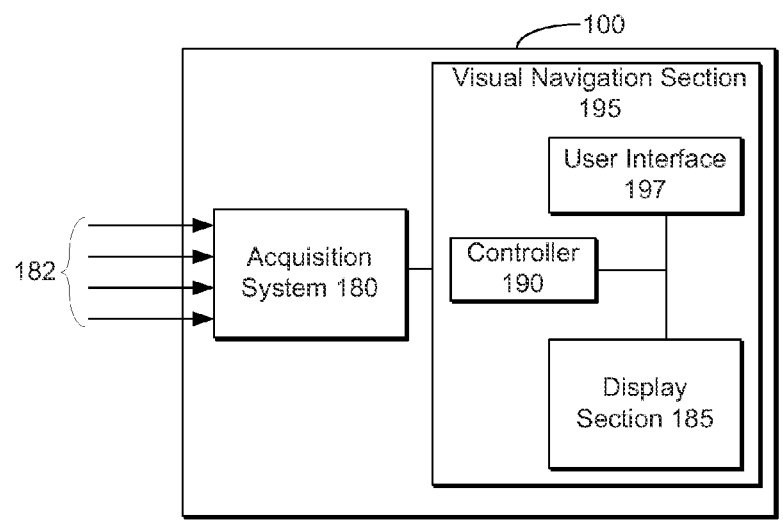
FIG. 1B illustrates a block diagram of a test and measurement instrument according to an example embodiment of the invention.

FIG. 1A illustrates a diagram of a display 105 of an oscilloscope 100 according to an example embodiment of the present invention. FIG. 1B illustrates a block diagram of certain components of the oscilloscope 100. Reference is now made to FIGS. 1A and 1B.

The oscilloscope 100 may have one or more channels or inputs 182. The one or more input terminals 182 can receive signals having a frequency, for example, of between DC to 20+GHz. While certain components of the oscilloscope 100 are shown to be directly coupled to each other, it should be understood that the oscilloscope 100 can include a variety of other circuit or software components, inputs, outputs, and/or interfaces, which are not necessarily shown, but that can be disposed between or otherwise associated with the illustrated components of oscilloscope 100.

The oscilloscope 100 can include an acquisition system 180 for acquiring and processing one or more input signals. The one or more input signals can include one or more electrical input signals under test. The oscilloscope can also include a visual navigation section 195. The visual navigation section 195 can include a display section 185 having a display 105 for displaying the one or more input signals, a controller 190, and a user interface 197. The user interface 197 can include, for example, a pan and/or zoom control 145, a measure control 150, a search control 155, and a test control 160. In addition, the user interface 197 can include a mark set and/or clear control 170, a previous-marker control 165, and a next-marker control 175.

Moreover, the user interface 197 can include a protocol layer change control 140. It will be understood that the term "control" can include a knob, a button, an actuator, a selector, a switch, or any other suitable input for receiving information from a user of the oscilloscope 100. For example, the protocol layer change control 140 can be a detented knob, which allows a user to move up or down one or more layers of a protocol with one or more clockwise clicks or counter-clockwise clicks of the detented knob. To move several layers, the user can turn the knob several clicks. These and other similar aspects are described more fully below.

The user interface controls can be used to navigate different protocol layers in a selected protocol. Data protocols are usually defined in layers, which are generally referred to herein as z-layers. The term "z-layer" as used herein is interchangeable with "protocol layer." Each z-layer can be visually related to an underlying physical analog signal (e.g., 115). Moreover, each z-layer can be visually related to other protocol layers that are below or above the current z-layer. Such relationships can be visually depicted in the overview section 110 of the display 105. Alternatively, or in addition to, the relationship between the underlying physical analog signal and each z-layer can be visually depicted in the waveform view section 112.

In some embodiments, the physical analog layer is displayed by default when a protocol visualization mode is enabled. In addition, a label 120 denotes the current z-layer that the user is viewing, as further described below. Each layer can include a name. The name can include the protocol name and/or the current layer name. The label 120 can appear on the display when the user enters the protocol visualization mode.

In some embodiments, each z-layer can be visually drawn over the underlying physical analog signal 115. In some embodiments, each z-layer can be individually drawn, with or without the underlying physical analog signal, and/or simultaneously drawn in a hierarchical arrangement, as further described in detail below. When drawn in a hierarchical arrangement, each z-layer can be time aligned with the others, where possible.

The protocol layer change control 140 can be used to receive input from a user to move up or down the protocol layers. For example, the protocol layer change control 140 can be a detented knob. Moving the detented knob one click clockwise can cause the displayed protocol layer to move up one layer. Conversely, moving the detented knob one click counter-clockwise can cause the displayed protocol layer to move down one layer. A label (e.g., 120) can specify which protocol layer is currently visible on the display 105.

The overview section 110 can include a representation of an acquired physical waveform (e.g., 125), a highlighted portion (e.g., 130) of the acquired physical waveform, and a marker (e.g., 135) indicating the location of the highlighted portion. The waveform view 112 can include a zoomed view (e.g., 115) of the highlighted portion of the acquired physical waveform. The zoomed view can also include protocol information associated with one or more protocol layers corresponding to the highlighted portion, as further described in detail below.

The zoom control 145 can be used to increase and/or decrease the time duration of the waveform view 112. The highlighted portion 130 of the overview section 110 is also adjusted to reflect the amount of information visible in the waveform view 112 as a result of the zooming. The zoom control 145 can behave differently for different z-layers. For example, for some z-layers, the zoom control 145 can increase and/or decrease the time duration of information visible in the waveform view 112, although a zooming factor may constrain or otherwise alter the amount or type of zooming based on a protocol definition for that z-layer.

By way of another example, when a z-layer is changed using the protocol layer change control 140, zooming can automatically occur. In other words, the protocol definition for a particular z-layer can influence how much automatic zooming occurs when the protocol layer change control 140 is used to change from one z-layer to another. How the zooming is constrained depends on the protocol definition for the specific protocol layer, which can be predefined by the developer of the protocol.

More specifically, when the second protocol information is associated with a protocol layer, the zoom control is structured to increase or decrease the time duration associated with the second protocol information subject to predetermined constraints defined by a protocol definition for that protocol layer. Furthermore, a change between the first and second protocol information using the protocol layer change control 140 can cause the controller 190 to automatically zoom in or zoom out the waveform view responsive to the change.

The panning control 145 can move the waveform view 112 forward or backward in time. However, for particular z-layers, the panning can cause the waveform view 112 to move based on different criteria. For example, if a z-layer includes protocol information having packets or frames, then the panning can be between the packets or frames. In other words, panning forward can move the waveform view 112 forward by one or more packets, or by one or more frames. Similarly, panning backward can move the waveform view 112 backward by one or more packets, or by one or more frames.

If there are dead or blank spots, the panning can automatically jump to the next packet or frame. In some embodiments, the panning control 145 can cause automatic zooming if the z-layer requires that at least one packet or other type of protocol frame be completely visible at one time. Such panning behavior can depend on the protocol definition for the specific protocol layer, which can be predefined by the developer of the protocol.

It will be understood that while the zooming and/or panning control 145 is illustrated as a single control, two separate controls can be used.

FIGS. 2-6 illustrate diagrams of a display of a test and measurement instrument showing different protocol information according to some example embodiments of the invention. Reference is now made to FIGS. 2-6.

As mentioned above, the underlying physical analog signal 115 can be visible on the waveform view 112 of the display 105 either independently or simultaneously with other protocol information. When the physical analog signal 115 is analyzed independently, the label 220 can indicate that only the analog signal 115 is currently displayed. Different protocol information can be shown on the display 105, in an iterative or sequential manner, or alternatively, in a simultaneous manner.

For example, first protocol information such as the physical analog signal 115 is displayable on the display 105. The first protocol information can include a portion of a waveform associated with a first sub-layer of a physical layer of the protocol. It will be understood that the first protocol layer need not be a physical layer of the protocol, but can be any type of protocol information or otherwise represent any portion of a protocol layer. While many protocols include a physical layer as the bottom layer, having associated sub-layers, the inventive concepts described herein are not limited as such. Any suitable protocol with any suitable number of protocol layers can be arranged and analyzed using the techniques described herein.

Second protocol information such as protocol information 315 is displayable on the display 105. Preferably, the second protocol information overlays the first protocol information 115 so that both the first and second protocol information are simultaneously visible. Alternatively, the second protocol information 315 can be displayed independently without the first protocol information 115. The second protocol information 315 can be associated with the same protocol as the first protocol information 115.

The second protocol information 315 can include a portion of a physical bit stream associated with a second sub-layer of the physical layer of the protocol. In other words, the second protocol information 315 can include clock edges and the conversion from an analog signal to a digital bitstream. The method used to make the digital conversion can be specified as part of the protocol definition, and can vary from one protocol to another.

The protocol layer change control 140 can receive input from a user to change the display between the first protocol information 115 and the second protocol information 315. In some embodiments, the protocol layer change control 140 can cause the second protocol information 315 to appear and overlay the first protocol information 115. In some embodiments, the protocol layer change control 140 can cause the second protocol information 315 to replace the first protocol information 115, or vice versa.

The controller 190 (of FIG. 1B) can cause the display to change between the different protocol information responsive to input received through the protocol layer change control 140. When the second protocol information 315 is selected, the label 320 can indicate that the second protocol information 315 is currently visible on the display. Similarly, when the first protocol information 115 is selected, the label 220 can indicate that the first protocol information 115 is currently visible on the display.

Some protocols can have many layers. The protocol layer change control 140 can be used to change between any number of protocol layers. For example, a protocol may have five different protocol layers. Each layer can have a different kind of protocol information available for display. Third protocol information (e.g., 415), fourth protocol information (e.g., 515), and fifth protocol information (e.g., 615) are displayable on the display 105, and can also be associated with the same protocol as the first protocol information (e.g., 115) and then second protocol information (e.g., 315). In other words, the controller 190 (of FIG. 1B) can cause the display to change between the first, second, third, fourth, and fifth protocol information responsive to input received through the protocol layer change control 140. In some embodiments, the underlying physical analog signal (e.g., 115) remains on the display while the second, third, fourth, and/or fifth protocol information individually overlay the physical analog signal.

By way of yet another example, the third protocol information (e.g., 415) can include a portion of a physical word stream associated with a sub-layer of a physical layer of the protocol. In other words, the bitstream 315 can be converted into hex notation and the converted data can be time aligned with the underlying analog data. In other words, alternate views of the same data can be simultaneously displayed and navigated. The same data can be represented, for example, as both hex and binary data. By way of still another example, a layer of 8b10b symbols can be simultaneously displayed with 8 bit data, all of which can be simultaneously navigated and analyzed.

The fourth protocol information (e.g., 515) can include one or more Ethernet frames (e.g., 530) associated with an Ethernet layer of the protocol. This layer breaks the underlying data into Ethernet frames and can decode the relevant information associated with the frame. The frames can be visible in the waveform view 112 and/or in the overview section 110 as a series of dots or dashes 535. It will be understood that Ethernet frames are described as an exemplary embodiment, and the fourth protocol information can include other types of data besides Ethernet frames.

The fifth protocol information (e.g., 615) can include one or more Internet Protocol (IP) packets (e.g., 630) associated with an Internet Protocol (IP) layer of the protocol. The packets can be visible in the waveform view 112 and/or in the overview section 110 as a series of dots or dashes 635. These are examples of the different types of protocol information that can be represented on the display. It will be understood that other types of protocol information associated with different types of protocol layers can also be displayed. It will be understood that IP packets are described as an exemplary embodiment, and the fifth protocol information can include other types of data besides IP packets.

As mentioned above, the pan control 145 can be used to move the protocol information forward or backward in time. When the first, second, or third protocol information is selected, the pan control 145 can move the first, second, or third protocol information forward or backward in time, respectively. If the fourth protocol information corresponds to Ethernet frames, then the pan control 145 can move between Ethernet frames 530 when the fourth protocol information is selected. In other words, panning left or right no longer simply moves a time window, but rather, panning left or right moves from one frame to another. Since frames can change size, panning can automatically cause the waveform view 112 to rescale, thereby always showing at least one entire frame. Once the panning has stopped for a predefined period of time, such as for two seconds, then a window 540 can appear showing the common elements of that frame. Alternatively, or in addition to the time-triggered approach, the window 540 can appear showing the common elements of that frame in response to the user hovering, clicking, touching, or otherwise selecting that particular frame. The common elements of the Ethernet frame can include, for example, a destination address, a source address, a type of frame such as "IP", data 525, and any other suitable information for an Ethernet frame. Since there can be more data than can fit in the window 540, the user can navigate within the window 540, or otherwise expand the window 540 so that all of the information can be observed at one time.

If the fifth protocol information corresponds to IP packets, then the pan control 145 can move between IP packets 630 when the fifth protocol information is selected. In other words, panning left or right no longer simply moves a time window, but rather, panning left or right moves from one packet to another. Since packets can change size, panning can automatically cause the waveform view 112 to rescale, thereby always showing at least one entire packet. Once the panning has stopped for a predefined period of time, such as for two seconds, then a window 640 can appear showing the common elements of that IP packet. Alternatively, or in addition to the time-triggered approach, the window 640 can appear showing the common elements of that IP packet in response to the user hovering, clicking, touching, or otherwise selecting that particular packet. The common elements of the IP packet can include, for example, a destination address, a source address, a type of frame such as "TCP", data 625, and any other suitable information for an IP packet. Other common elements can include rise mean, rise min (minimum), rise max (maximum), and/or overshoot mean (not shown).

Similar to the labels 220 and 320 mentioned above, when the third protocol information 415 is selected, the label 420 can indicate that the third protocol information 415 is currently visible on the display. When the fourth protocol information 515 is selected, the label 520 can indicate that the fourth protocol information 515 is currently visible on the display. When the fifth protocol information 615 is selected, the label 620 can indicate that the fifth protocol information 615 is currently visible on the display.

Searching for specific information can be protocol layer context specific. In other words, if the current z-layer corresponds to the IP layer of the protocol, then a user can define criteria to search for all packets with the source or destination IP address of 192.168.1.129. Such information can be associated with the IP layer of the protocol. The user can select the previous-marker control (e.g., 165) to go to the previous packet that meets the criteria. Similarly, the user can select the next-marker control (e.g., 175) to go to the next packet that meets the criteria. In this manner, the user can quickly locate and analyze all packets meeting the specified criteria.

By way of yet another example, the user can define criteria to search for packets containing rising edges greater than 1.65 nS (nanoseconds), and whose source IP address is 192.168.1.9. By way of still another example, the user can define criteria to search for a source address of 192.168.1.127, and to also display the mean rise time of the packets meeting such criteria. The user can then use the previous-marker control (e.g., 165) and the next-marker control (e.g., 175) to navigate the packets that meet the selected criteria. It will be understood that other similar types of criteria can be used. Markers can be placed at the locations on the protocol layer and/or waveform that meet the criteria. The default mode of marker operation can be to place markers that meet the search criteria in only the z-layer in which the search criteria was applied. In addition, an alternative mode of marker operation can be to place markers at corresponding locations among multiple protocol layers, including for example, the underlying physical analog waveform that meet the criteria. In this manner, the information meeting the criteria can be efficiently searched and analyzed across different protocol layers of the protocol.

Some types of markers can by default be seen in different z-layers. For example, a spec violation in the physical layer can cause an error marker to be placed at the corresponding location in the physical analog signal. Error markers can be made visible by default in all layers, or in all layers above the layer in which the error occurred. This makes visually relating issues between protocol layers possible. Markers that are visible to all protocol layers can visually note the layer they are from. This allows the user to see a marker for an edge placement that was out of spec on all of the protocol layers. Individual markers (e.g., 780 and 785) can be associated with different protocol levels. In other words, the display can include "mark hierarchies" in which navigating through the protocol hierarchy can cause different markers to be displayed in different protocol layers. Alternatively, or in addition to the mark hierarchies, different markers can be displayed in the overview section.

By way of additional examples, search contexts can include an entire waveform or a portion of a waveform between gating cursors. Search criteria can be within different contexts as well. For example, if the user wants to visualize the IP layer and ask for packets with the source IP address of 192.168.1.127, markers can be placed on this layer only. Alternatively, a user can perform a hierarchical search by using items on one layer to constrain searches on another. For instance, if the user was analyzing the IP layer and asks to mark all "rise>2.3 ns" for packets with the source IP address of 192.168.1.28, then markers are placed on both the IP layer and the underlying physical layers. This allows the user to move between those layers to see the marked items.

It will be understood that six or more protocol layers can be displayed, along with their associated protocol information. Where there are six or more protocol layers, similar types of labels can indicate when the individual protocol layers are visible on the display. Moreover, similar types of searching, marking, and analyzing can be performed for one or more of the multiple layers.

FIG. 7 illustrates a diagram of a display of a test and measurement instrument simultaneously showing first protocol information 115, second protocol information 315, third protocol information 415, fourth protocol information 515, and fifth protocol information 615 in a hierarchical view according to another example embodiment of the invention.

A list view section 705 displays the different protocol information in the hierarchical view. The list view section 705 can cause one or more of the different protocol layers to be simultaneously visible. Each layer can be collapsed or expanded using the list view section 705. In other words, the hierarchy of protocol layers can be stacked vertically. Each protocol layer can be individually selected, highlighted, and/or made visible on the display. A user can explore the hierarchy of protocol layers by expanding or closing levels of the hierarchy using an icon such as one or more '+/−' icons (e.g., 710, 715, 720, 725, and 730) associated with the list views. In addition, one or more of the different protocol layers can overlay the underlying physical analog signal 115, and can be simultaneously displayed for further analysis.

More specifically, if node 710 is selected, then the fifth protocol information 615 can be collapsed or expanded so that it is visible or not on the display. Similarly, if node 715 is selected, then the fourth protocol information 515 can be collapsed or expanded so that it is visible or not on the display. If node 720 is selected, then the third protocol information 415 can be collapsed or expanded so that it is visible or not on the display. If node 725 is selected, then the second protocol information 315 can be collapsed or expanded so that it is visible or not on the display. If node 730 is selected, then the first protocol information 115 can be collapsed or expanded so that it is visible or not on the display.

The list view section 705 can receive input from a user to change whether or not the first, second, third, fourth, and/or fifth protocol information is selected in the hierarchical view on the display. In addition, individual parts or items of a particular protocol layer can be selected, which can cause contributing items from another protocol layer or contributor items from another protocol layer to be highlighted. In this manner, a correspondence can be made between related items from different protocol layers, as further described below.

One or more navigational relationships 735, 740, 745, 750, and 755 can be associated with and/or displayed in association with the protocol information 615, 515, 415, 315, and 115, respectively. The navigational relationships can include a selected item, a contributing item, and an item to which the selected item contributes for associating two or more of the first, second, third, fourth, and fifth protocol information in the hierarchy.

By way of another example, the list view section 705 can include a selected protocol information from among the first 115, second 315, third, 415, fourth 515, and fifth 615 protocol information. The selected protocol information can include a selected item within the selected protocol information, such as selected item 417 in protocol layer 415. Responsive to selecting item 417, a contributing item such as 317 in protocol layer 315 can be highlighted to indicate a relationship with the selected item 417. In addition, an item to which the selected item contributes, such as IP packet 617, can be highlighted to indicate a relationship with the selected item 417.

Navigation relationships between elements of different protocol layers is made possible by associating an item with its source item and contributing instances. Such an association can be made by either using an external index table or by carrying the relationship information along with the item. For example, a bit might be constructed from a specific time range of an oscilloscope channel (e.g., Ch1), and the bit can be associated with the specific time range of the channel. A user can point at or otherwise select a protocol layer or waveform and be informed of the associated bit. Or alternatively, the user can point at or otherwise select the bit and be informed of the associated waveform. Such source and item instance information can be used to associate different items up and down the protocol layer hierarchy. This also allows navigation up and down the protocol hierarchy. In addition, measurement and marking of aspects of the different protocol layers are facilitated using the navigation relationships.

The visual navigation information 735, 740, 745, 750, and 755 can be related to one or more of the protocol layers. The visual navigation can include a variety of useful information to aid in the analysis of the various layers. For example, the visual navigation information can include descriptive text related to a selected one of the first, second, third, fourth, and/or fifth protocol information. The descriptive text can indicate how one or more items of a particular protocol layer are related to another part or item of the same or different protocol layer. The visual navigation information can include a graphic or other visual cue related to a selected one of the first, second, third, fourth, and/or fifth protocol information. The graphic or visual cue can indicate how one or more items of a protocol layer are related to another part or item of the same or different protocol layer.

The visual navigation information can also include a measurement annotation related to a selected one of the first, second, third, fourth, and/or fifth protocol information. Measurements can be layer sensitive. If a user wants to measure an aspect of a selected protocol layer, such as an IP packet layer, an available measurement can be "packet count." Alternatively, if the physical analog layer is the selected layer, then the user can measure "fall mean." Different types of measurement annotations are available in different contexts for different types of protocol layers. Measurements available in the user interface can be influenced by this protocol context. A user can choose a measurement "snapshot" when analyzing a specific layer, which can display the most pertinent or common requested measurements for that layer. For example, the IP layer might include measurement annotations for packet count, average packet size, TCP count, UDP count, ARP count, and so forth.

Moreover, the visual navigation information can include a visual relationship graph related to a selected one of the first, second, third, fourth, and/or fifth protocol information. The visual relationship graph can indicate how one or more items of a protocol layer are related to another part or item of the same or different protocol layer. In addition, the visual navigation information can include one or more links that allow movement to related items that are either referenced by a selected one of the first, second, third, fourth, and fifth protocol information, or that the selected one of the first, second, third, fourth, and fifth protocol information references. The one or more links allows movement to related items that are either referenced by or that the item references. The visual navigation information can include other suitable visual annotations such as measurement annotations or visual relationship graphs. As mentioned above, each protocol layer can be time aligned with the others, where possible.

The visual navigation information can be used for complex measurements, analysis, and/or data mining. For example, a user can request that all of the glitches on Ch1 (channel 1) of the oscilloscope that are less than 2.4 uS (microseconds) which are in the I2C data fields which have a value less than 0x50 are found and displayed. This can be accomplished by following the navigation information down from the I2C data fields that are less than 0x50, creating a set of time windows, and using that set of time windows to provide additional analysis and navigation. The mining results can be used for navigation and/or visualization.

Figure 8:
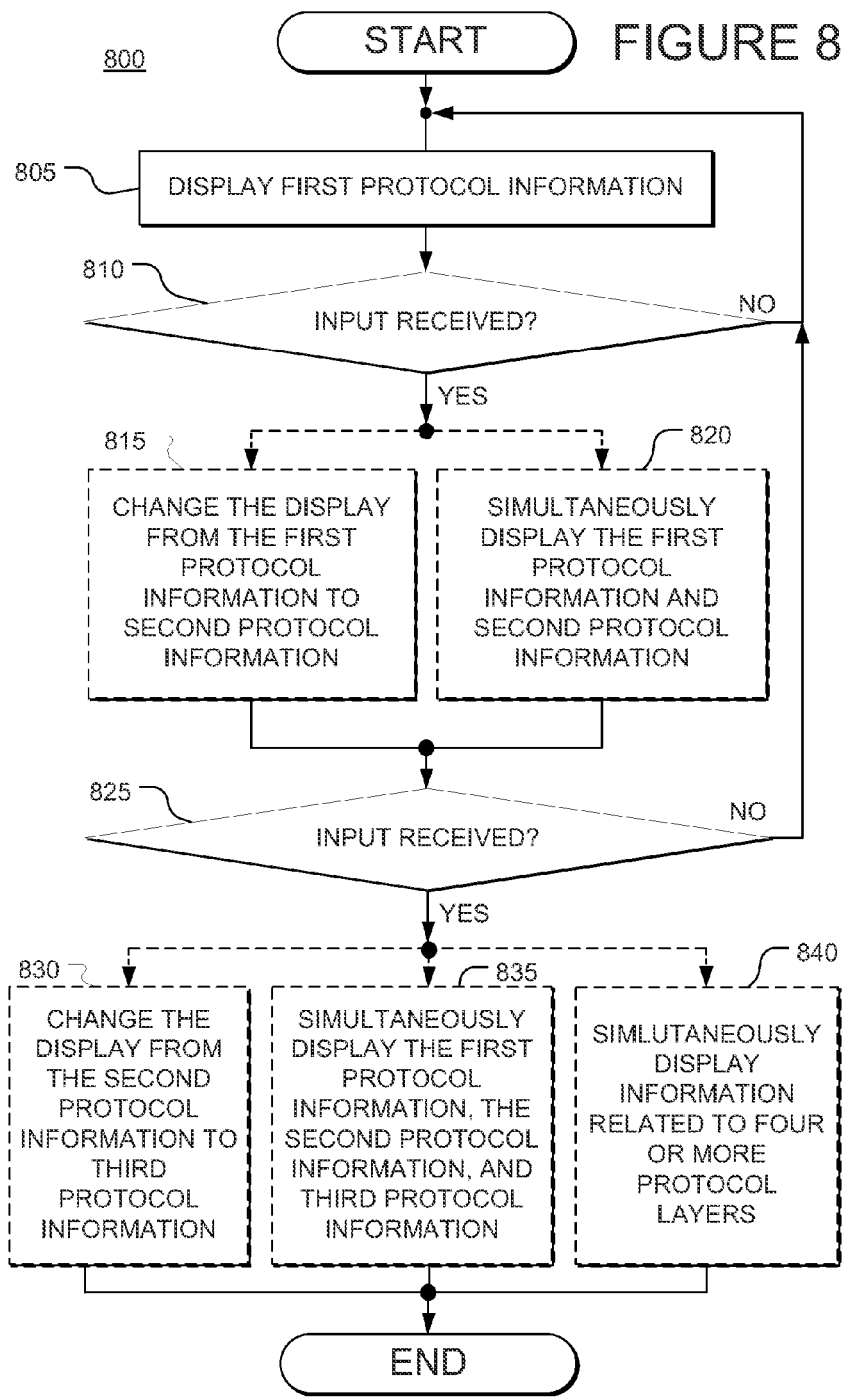
FIG. 8 illustrates a flow diagram demonstrating a technique for visually displaying and navigating protocol information on a test and measurement instrument according to another example embodiment of the invention.

FIG. 8 illustrates a flow diagram 800 demonstrating a technique for visually displaying and navigating protocol information on a test and measurement instrument according to another example embodiment of the invention.

The technique and flow begins at 805 where first protocol information, including for example a protocol layer, is displayed on the display of the oscilloscope. The first protocol information can include an underlying physical analog signal, as described in detail above. Alternatively, the first protocol information can represent any protocol layer or portion of a protocol layer that is associated with a protocol. At 810, a determination is made whether input is received from a user, for example, from the protocol layer change control. If NO, the flow returns to 805. Otherwise, if YES, meaning input is received, then the flow can take one of two different paths.

The path corresponding to 815 changes the display from the first protocol information to second protocol information. In this manner, the user can select which protocol layer information is currently visible on the display. The alternative path corresponding to 820 simultaneously displays the first protocol layer information and the second protocol information. In some embodiments, the second protocol information overlays the first protocol layer on the display. In some embodiments, the second protocol information is displayed in a hierarchical arrangement with respect to the first protocol information, as described in detail above.

At 825, a determination is made whether additional input is received. If NO, the flow returns to 805. Otherwise, if YES, meaning additional input is received, then the flow can take one of two different paths.

The path corresponding to 830 changes the display from the second protocol information to third protocol information. In this manner, the user can select which protocol layer information is currently visible on the display. The alternative path corresponding to 835 simultaneously displays the first protocol layer information, the second protocol information, and the third protocol information. The alternative path corresponding to 840 simultaneously displays information related to four or more protocol layers. In some embodiments, the second and third protocol information overlay the first protocol layer on the display. In some embodiments, the second and third protocol information are displayed in a hierarchical arrangement with respect to the first protocol information, as described in detail above.

Although particular embodiments have been described, it will be appreciated that the principles of the invention are not limited to those embodiments. For example, any type of protocol can be analyzed including, for example, serial data protocols such as SATA, Fibre Channel, serial attached SCSI (SAS), USB, FireWire, and the like. By way of another example, protocols can include multiple input decoders such as SPI or I²C, or multi-lane hierarchical decoders such as PCIe and DisplayPort. Protocols need not be digital. For instance, analog TV signals and other non-digital hierarchical signals can also be classified as protocols, and analyzed using the inventive principals disclosed herein.

In some embodiments, an article drawn from the set including floppy disks, optical disks, fixed disks, volatile memory, non-volatile memory, random access memory, read-only memory, or flash memory, comprising a machine-accessible medium having associated non-transitory instructions that, when executed in a test and measurement device, results in a machine performing the steps of the various embodiments of the invention as disclosed herein. Other variations and modifications may be made without departing from the principles of the invention as set forth in the following claims.

The invention claimed is:

1. A visual navigation apparatus of a test and measurement instrument, comprising:
   a display screen;
   first protocol information displayable on the display screen, the first protocol information including a portion of a waveform associated with a first sub-layer of a physical layer of a protocol;
   second protocol information displayable on the display screen, the second protocol information including a physical bitstream associated with a second sub-layer of the physical layer of the protocol and including a first protocol level event associated with the physical layer of the protocol;
   third protocol information displayable on the display screen, the third protocol information including a portion of a physical wordstream associated with a third sub-layer of the physical layer of the protocol and including a second protocol level event associated with a third sub-layer of the physical layer of the protocol;
   fourth protocol information displayable on the display screen, the fourth protocol information including one or more Ethernet frames associated with an Ethernet layer of the protocol and including a third protocol level event associated with the physical layer of the protocol; and
   fifth protocol information displayable on the display screen, the fifth protocol information including one or more Internet Protocol (IP) packets associated with an Internet Protocol (IP) layer of the protocol and including a fourth protocol level event associated with the physical layer of the protocol.
   wherein the display screen is operative to present the first protocol information, the second protocol information, the third protocol information, the fourth protocol information, and the fifth protocol information at the same time,
   wherein the first protocol information, the second protocol information, the third protocol information, the fourth protocol information, and the fifth protocol information are each distinct, and
   wherein the first protocol information can encode the second protocol information, the second protocol information can encode the third protocol information, the third protocol information can encode the fourth protocol information, and the fourth protocol information can encode the fifth protocol information.

2. The visual navigation apparatus of claim 1, wherein:
   the protocol layer change control is structured to receive input from the user to change the display screen between the first sub-layer and the second sub-layer of the physical layer of the protocol.

3. The visual navigation apparatus of claim 1, wherein the first, second, third, fourth, and fifth protocol information are simultaneously displayed in a multi-lane hierarchical view on the display screen, the apparatus further comprising:
   a list view section structured to receive input from a user to change whether or not the first, second, third, fourth, and fifth protocol information is selected in the hierarchical view on the display screen.

4. The visual navigation apparatus of claim 3, further comprising one or more navigation relationships, each navigation relationship including a selected item, a contributing item, and an item to which the selected item contributes for associating two or more of the first, second, third, fourth, and fifth protocol information in the hierarchy.

5. The visual navigation apparatus of claim 4, wherein:
   the list view section includes a selected protocol information from among the first, second, third, fourth, and fifth protocol information;
   the selected protocol information includes the selected item within the selected protocol information; and
   the contributing item is highlighted to indicate a relationship with the selected item.

6. The visual navigation apparatus of claim 4, wherein:
   the list view section includes a selected protocol information from among the first, second, third, fourth, and fifth protocol information;
   the selected protocol information includes the selected item within the selected protocol information; and
   the item to which the selected item contributes is highlighted to indicate a relationship with the selected item.

7. The visual navigation apparatus of claim 1, further comprising a label specifying which of the first, second, third, fourth, and fifth protocol information is currently visible on the display screen.

8. The visual navigation apparatus of claim 1, wherein:
   the protocol layer change control is structured to receive input from the user to change the display screen between the first, second, third, fourth, and fifth protocol information.

9. The visual navigation apparatus of claim 1, further comprising:
   visual navigation information on the display screen related to at least one of the first, second, third, fourth, and fifth protocol information.

10. The visual navigation apparatus of claim 9, wherein the visual navigation information includes at least one of (a) a visual relationship graph related to a selected one of the first, second, third, fourth, and fifth protocol information, and (b) one or more links that allow movement to related items that are either referenced by a selected one of the first, second, third, fourth, and fifth protocol information, or that the selected one of the first, second, third, fourth, and fifth protocol information references.

11. The visual navigation apparatus of claim 8, further comprising a pan control structured to:
   move the first protocol information forward or backward in time when the first protocol information is selected;
   move the second protocol information forward or backward in time when the second protocol information is selected;
   move the third protocol information forward or backward in time when the third protocol information is selected;
   move between Ethernet frames when the fourth protocol information is selected;
   move between IP packets when the fifth protocol information is selected; and
   the display screen is operative to move at least another of the first protocol information
   second protocol information, third protocol information, Ethernet frames, and IP packets forward or backward responsive to the operation of the pan control.

12. The visual navigation apparatus of claim 1, wherein:
the display screen is divided into at least an overview and a waveform view;
the overview includes a representation of an acquired physical waveform, a highlighted portion of the acquired physical waveform, and a marker indicating the location of the highlighted portion; and
the waveform view includes a zoomed view of the highlighted portion of the acquired physical waveform, wherein the zoomed view corresponds to the first protocol information.

13. The visual navigation apparatus of claim 12, wherein the second protocol information is displayed over the first protocol information in the waveform view so that both the first and second protocol information are simultaneously visible.

14. The visual navigation apparatus of claim 12, further comprising a zoom control structured to increase or decrease the time duration of the waveform view.

15. The visual navigation apparatus of claim 14, wherein when the second protocol information is associated with a protocol layer, the zoom control is structured to increase or decrease the time duration associated with the second protocol information subject to predetermined constraints defined by a protocol definition for the protocol layer.

16. The visual navigation apparatus of claim 12, further comprising a controller structured to automatically zoom the waveform view responsive to a change between the first protocol information and the second protocol information using a protocol layer change control.

17. A method for visually navigating protocol information on a test and measurement device, the method comprising:
simultaneously displaying first protocol information including a portion of a waveform associated with a first sub-layer of a physical layer of a protocol on a display screen, a second protocol information including a physical bitstream associated with a second sub-layer of the physical layer of the protocol and including a first protocol level event associated with the physical layer of the protocol, a third protocol information a portion of a physical wordstream associated with a third sub-layer of the physical layer of the protocol and including a second protocol level event associated with the physical layer of the protocol, a fourth protocol information including one or more Ethernet frames associated with an Ethernet layer of the protocol and including a third protocol level event associated with the physical layer of the protocol, and a fifth protocol information including one or more Internet Protocol (IP) packets associated with an Internet Protocol (IP) layer of the protocol and including a fourth protocol level event associated with the physical layer of the protocol;
receiving input from a user; and
changing the display screen of the first protocol information, second protocol information, third protocol information, fourth protocol information, and fifth protocol information responsive to the input,
wherein the first protocol information, the second protocol information, the third protocol information, the fourth protocol information, and the fifth protocol information are each distinct , and
wherein the first protocol information can encode the second protocol information, the second protocol information can encode the third protocol information, the third protocol information can encode the fourth protocol information, and the fourth protocol information can encode the fifth protocol information.

18. The method of claim 17, wherein receiving the input includes receiving the input through a protocol layer change control.

19. The method of claim 17, further comprising:
simultaneously displaying the first protocol information, the second protocol information, the third protocol information, the fourth protocol information, and the fifth protocol information in a hierarchical view on the display screen,
wherein:
receiving the input includes receiving the input through a list view section of the display screen.

20. One or more tangible computer-readable media storing non-transitory computer-executable instructions that, when executed by a processor, operate to:
simultaneously display first protocol information including a portion of a waveform associated with a first sub-layer of a physical layer of a protocol on a display screen, a second protocol information including a physical bitstream associated with a second sub-layer of the physical layer of the protocol and including a first protocol level event associated with the physical layer of the protocol, a third protocol information a portion of a physical wordstream associated with a third sub-layer of the physical layer of the protocol and including a second protocol level event associated with the physical layer of the protocol, a fourth protocol information including one or more Ethernet frames associated with an Ethernet layer of the protocol and including a third protocol level event associated with the physical layer of the protocol, and a fifth protocol information including one or more Internet Protocol (IP) packets associated with an Internet Protocol (IP) layer of the protocol and including a fourth protocol level event associated with the physical layer of the protocol;
receive input from a user; and
change the display screen of the first protocol information, second protocol information, third protocol information, fourth protocol information, and fifth protocol information responsive to the input,
wherein the first protocol information, the second protocol information, the third protocol information, the fourth protocol information, and the fifth protocol information are each distinct , and
wherein the first protocol information can encode the second protocol information, the second protocol information can encode the third protocol information, the third protocol information can encode the fourth protocol information, and the fourth protocol information can encode the fifth protocol information.

* * * * *